(12) United States Patent
Gao et al.

(10) Patent No.: US 8,988,902 B2
(45) Date of Patent: Mar. 24, 2015

(54) POWER CONVERTER CONTROLLER IC HAVING PINS WITH MULTIPLE FUNCTIONS

(75) Inventors: Xiaolin Gao, Santa Clara, CA (US); Yong Li, San Jose, CA (US); Qiu Sha, Cupertino, CA (US); Fuqiang Shi, Oak Park, IL (US); John William Kesterson, Seaside, CA (US); Jiang Chen, Cupertino, CA (US)

(73) Assignee: Dialog Semiconductor, Inc., Campbell, CA (US)

( * ) Notice: Subject to any disclaimer, the term of this patent is extended or adjusted under 35 U.S.C. 154(b) by 212 days.

(21) Appl. No.: 13/612,607

(22) Filed: Sep. 12, 2012

(65) Prior Publication Data

US 2013/0121044 A1    May 16, 2013

Related U.S. Application Data

(60) Provisional application No. 61/559,840, filed on Nov. 15, 2011.

(51) Int. Cl.
*H02M 3/335* (2006.01)
*H02M 1/32* (2007.01)

(52) U.S. Cl.
CPC ............ *H02M 1/32* (2013.01); *H02M 3/33523* (2013.01)
USPC .......................................... 363/21.12; 363/19

(58) Field of Classification Search
USPC ........ 363/16–20, 21.04, 21.07, 21.13, 37, 41, 363/49, 56.1, 97, 98, 131; 323/282–285
See application file for complete search history.

(56) References Cited

U.S. PATENT DOCUMENTS

| | | | |
|---|---|---|---|
| 6,518,733 B1 | 2/2003 | Schenkel et al. | |
| 6,944,034 B1 * | 9/2005 | Shteynberg et al. | ........ 363/21.13 |
| 7,061,780 B2 * | 6/2006 | Yang et al. | .................. 363/21.16 |
| 7,123,488 B2 * | 10/2006 | Hirabayashi et al. | ........... 363/19 |
| 7,515,444 B2 * | 4/2009 | Chen | ............................... 363/97 |
| 7,880,447 B1 | 2/2011 | Lin et al. | |

(Continued)

FOREIGN PATENT DOCUMENTS

| CN | 2049424 U | 12/1989 |
|---|---|---|
| CN | 1818681 A | 8/2006 |

(Continued)

OTHER PUBLICATIONS

Korean Intellectual Property Office, Office Action, Korean Patent Application No. 10-2012-0117666, Oct. 8, 2013, eight pages.

(Continued)

*Primary Examiner* — Rajnikant Patel
(74) *Attorney, Agent, or Firm* — Fenwick & West LLP

(57) ABSTRACT

A controller integrated circuit (IC) for controlling a power converter uses one or more IC pins having plurality of functions such as configuration of a parameter supported by the controller IC and shutdown protection. Several different functions may be supported by a single IC pin, thereby reducing the number of pins required in the controller IC and also reducing the cost of manufacturing the controller IC. The controller IC may also share a comparison circuit among different pins and the different functions provided by those pins. Use of a shared comparison circuit further reduces the cost of manufacturing the controller IC without sacrificing the performance of the IC.

30 Claims, 4 Drawing Sheets

(56) References Cited

U.S. PATENT DOCUMENTS

2003/0034765 A1    2/2003    Yang
2006/0145675 A1    7/2006    Lee et al.

FOREIGN PATENT DOCUMENTS

| CN | 201601877 U | 10/2010 |
|---|---|---|
| CN | 101997415 A | 3/2011 |

OTHER PUBLICATIONS

State Intellectual Property Office of the People's Republic of China, First Office Action, Chinese Patent Application No. 201210470649.0, Aug. 5, 2014, twelve pages.

\* cited by examiner

POWER CONVERTER CONTROLLER IC HAVING PINS WITH MULTIPLE FUNCTIONS

CROSS-REFERENCE TO RELATED APPLICATION(S)

This application claims priority under 35 U.S.C. §119(e) to U.S. Provisional Patent Application Ser. No. 61/559,840, "Power Converter Controller IC Having Pins with Multiple Functions" filed Nov. 15, 2011, the subject matter of which is incorporated by reference herein in its entirety.

BACKGROUND

1. Field of the Disclosure

The present disclosure relates to a power converter and, more specifically, to a power converter controller IC (integrated circuit) that has one or more IC pins with multiple functions.

2. Description of the Related Art

With the recent explosive growth in the number of electronic devices, the demand for power converters used as adapters or chargers for these electronic devices has also grown at a rapid rate. Power converters are typically controlled by power converter controller ICs. In particular, switched mode power converters are typically controlled by power converter controller ICs that control the on-times ($T_{ON}$) or off-times ($T_{OFF}$) of the switch in the power converters to regulate the output voltage and power of the power converters.

The power converter industry is under significant pressure to manufacture power converter controller ICs that are highly efficient but can also be manufactured at low cost. Because the manufacturing cost of ICs is highly dependent upon the die size, the number of pins, the packaging, and testing of the IC, it is desirable to reduce the number of pins of an IC. However, it is difficult to reduce the number of pins in conventional power converter controller ICs. In conventional power converter controller ICs, each pin of the IC is associated with a single, separate parameter or function and thus the IC requires as many pins as the number of parameters or functions supported by the IC. Thus, in general, reducing the number of pins in the power converter controller IC also reduces the number of parameters or functions supported by the controller IC and sacrifices the performance of the power converter.

SUMMARY

Embodiments of the present disclosure include a power converter controller IC that uses one or more IC pins to support a plurality of functions, such as configuration of an operational parameter supported by the controller IC and shutdown protection. In some embodiments, a plurality of functions may be supported by a single IC pin, thereby reducing the number of pins required in the controller IC and also reducing the manufacturing cost of the controller IC. Other embodiments of the controller IC share a comparison circuit among different pins and the different functions provided by those pins. Use of a shared comparison circuit further reduces the cost of manufacturing the controller IC without sacrificing the performance of the IC.

In one embodiment, the controller IC comprises an IC pin to connect to circuitry that is external to the controller IC. The controller IC also includes control circuitry that operates in different modes during distinct periods of time. During one mode (e.g., configuration mode), the control circuitry configures a parameter of the controller IC, such as cable drop compensation (CDC), based on the voltage at the IC pin. During a different mode (e.g., shutdown protection mode), the control circuitry provides shutdown protection by powering down the power converter based on the voltage at the same IC pin, thereby providing protection from a harmful condition such as an over-voltage or over-temperature condition.

In one embodiment, the controller IC comprises a second IC pin to connect to its own external circuitry. During a third mode of operation (e.g., another shutdown protection mode), the control circuitry also provides shutdown protection by powering down the power converter based on the voltage at the second IC pin. A comparison circuit compares the voltage from the first IC pin to a reference voltage during the first and second modes. The comparison circuit is also shared with the second IC pin and compares the voltage from the second IC pin to a reference voltage during a third mode. The control circuitry configures a parameter based on an output of the comparison circuit during the first mode, and provides shutdown protection based on an output of the comparison circuit during the second and third modes.

In one embodiment, the controller IC is part of a power converter that converts an input voltage to an output voltage. The power converter also includes a transformer coupled between the input voltage and the output voltage of the power converter and a switch configured to control current through the transformer according to on and off times of the switch. The controller IC controls the on times and off times of the switch.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. It should be noted that from the following discussion, alternative embodiments of the structures and methods disclosed herein will be readily recognized as viable alternatives that may be employed without departing from the principles of the claimed disclosure.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

Figure 1:
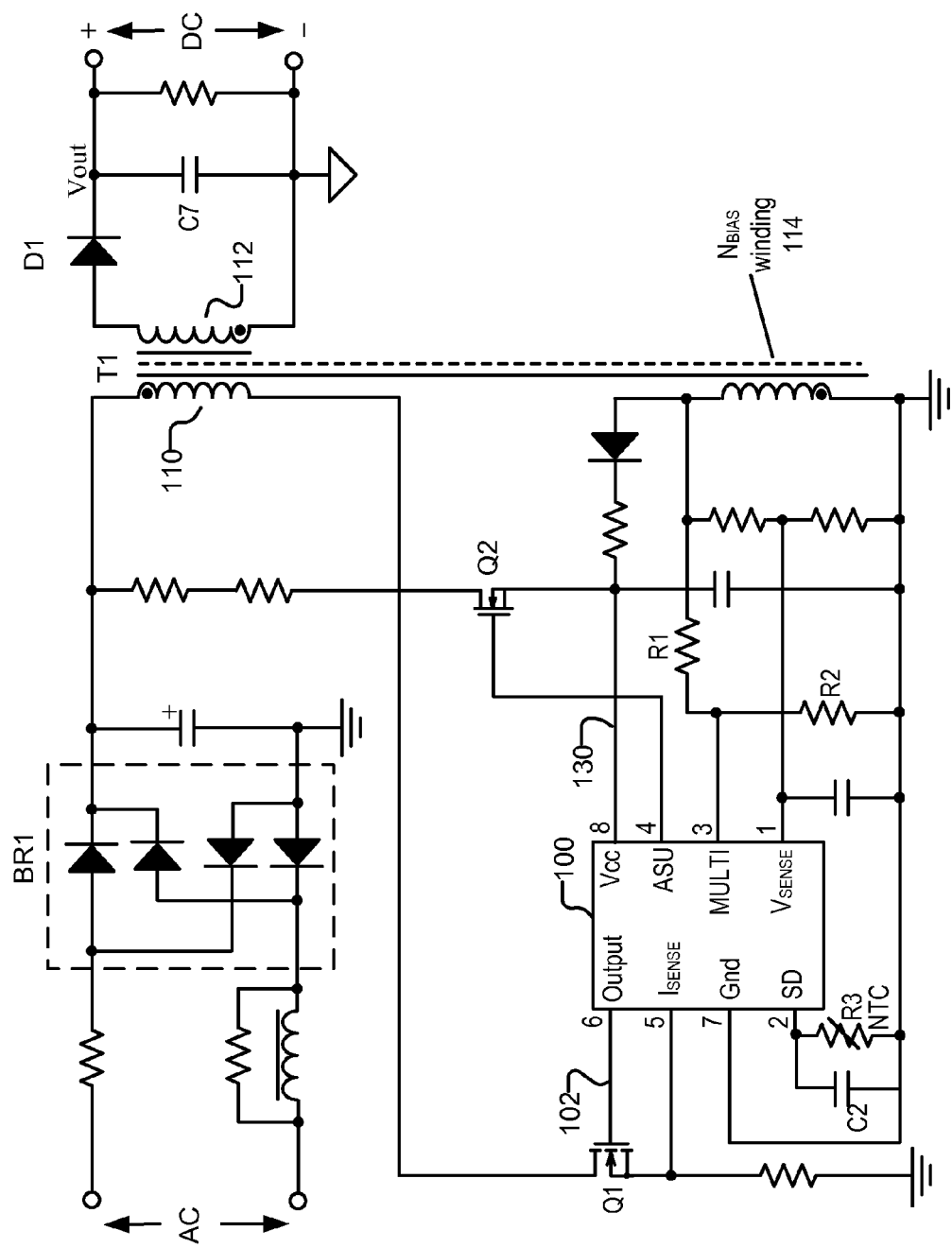
FIG. 1 is an AC-DC flyback power converter with primary-side sensing, according to one embodiment.

FIG. 1 illustrates AC-DC flyback power converter with primary-side sensing, according to one embodiment. Although the power converter of FIG. 1 is an AC-DC flyback converter with primary side sensing of the feedback signals, it should be noted that the present disclosure is not limited to a flyback converter and that it can be applied to any type of power converter of any topology and any type of feedback sensing. The power converter includes, among other components, a bridge rectifier BR1, a transformer T1, a transistor switch Q1, a transistor switch Q2, an output rectifier diode D1, output filter capacitor C7, a power converter controller IC 100, resistors R1, R2, capacitor C2 and negative temperature coefficient (NTC) resistor R3. The transformer T1 also includes a primary winding 110, a secondary winding 112, and an auxiliary bias winding 114.

The rectifier BR1 receives an input AC voltage and converts it into a full-wave rectified voltage for use in generating the output DC voltage. The power converter controller 100 controls the opening and closing of the switch Q1 using an output control signal 102 in the form of pulses with on-times ($T_{ON}$) and off-times ($T_{OFF}$). The output control signal 102 may be a periodic pulse with a fixed period, or a pulse with its period varying as necessary. When the switch Q1 is turned on because the pulse 102 is high during the on-time, energy is stored in the primary side windings of the transformer T1 because the diode D1 is reverse biased. When the switch Q1 is turned off, the energy stored in the primary windings 110 of the transformer T1 is released to the secondary side 112 of the transformer T1 because the diode D1 becomes forward biased. The diode D1 rectifies the output voltage on the secondary windings 112 of the transformer T1 and the capacitor C7 filters the output voltage signal on the secondary windings 112 of the transformer T1 for generating the output DC voltage. By controlling the period of time during which the switch Q1 is on or off, i.e., the on-times ($T_{ON}$) and off-times ($T_{OFF}$), the power converter controller 100 can control the amount of power delivered to the DC output.

As shown in FIG. 1, the power converter controller IC 100 has only 8 pins: Output, Vcc, $I_{SENSE}$, ASU (active start up), Gnd, MULTI, SD (shutdown) and $V_{SENSE}$. In one embodiment, the IC controller 100 operates the MULTI pin in different modes at different periods of time such that the MULTI pin can serve different functions. During a configuration mode (e.g. at power on), the controller IC 100 senses the resistance of external resistors R1 and R2 through the MULTI pin to configure an operational parameter of the controller IC 100. R1 and R2 may be configured by a user of the controller IC 100 to set the parameter to a desired configuration. During a shutdown protection mode (e.g., during or after startup), the controller IC 100 receives a divided down version of the voltage across the auxiliary windings $N_{BIAS}$ of the transformer T1 through the MULTI pin and uses this voltage for over-voltage protection (OVP). In some embodiments, the voltage of the MULTI pin may also serve as a feedback voltage (i.e. as $V_{SENSE}$) for regulating the DC output voltage.

Similarly, the SD pin may also serve different functions at different periods of time. During a configuration mode, the controller IC senses the value of external capacitor C2 through the SD pin to configure a parameter of the controller IC 100. The value of C2 may be configured by a user of the controller IC 100 to set the parameter to a desired configuration. During a shutdown protection mode, the controller IC 100 senses the resistance of NTC resistor R3 through the SD pin for providing over-temperature (OTP) protection or other forms of shutdown protection.

In the various shutdown modes, the voltages at the SD pin and the MULTI pins are thus used as indications of harmful conditions that could potentially damage the power converter or a load (not shown) of the power converter. If a protection condition is sensed, the IC controller 100 then provides shutdown protection by, for example, turning off switch Q1 to power off the output Vout of the power converter. The MULTI pin and SD pin are explained in more detail in conjunction with FIGS. 2A, 2B and 3.

The power converter controller 100 receives a supply voltage 130 via the Vcc pin, and is connected to ground via the Gnd pin. The ASU pin provides a control signal for active start up functionality of the supply voltage 130, and the pin may be left floating if active start up is not desired. When the AC input voltage is initially applied to the power converter, transistor Q2 is switched on to charge the power supply voltage 130 through the transistor Q2. Once the power supply voltage 130 has reached a threshold level and the flyback operation of the power converter is enabled, the switch Q2 is turned off and the power supply voltage 130 is maintained by a reflected secondary voltage on the auxiliary windings $N_{BIAS}$ of the transformer T1.

The power converter controller 100 generates and outputs the pulse 102 for controlling the switch Q1 via the Output pin. The $I_{SENSE}$ and $V_{SENSE}$ pins receive feedback signals for regulating the on and off times of switch Q1. Specifically, the $I_{SENSE}$ pin senses the current flowing through switch Q1. The $V_{SENSE}$ pin receives a divided-down version of the reflected secondary voltage on the auxiliary windings $N_{BIAS}$ of the transformer T1.

Figure 2A:
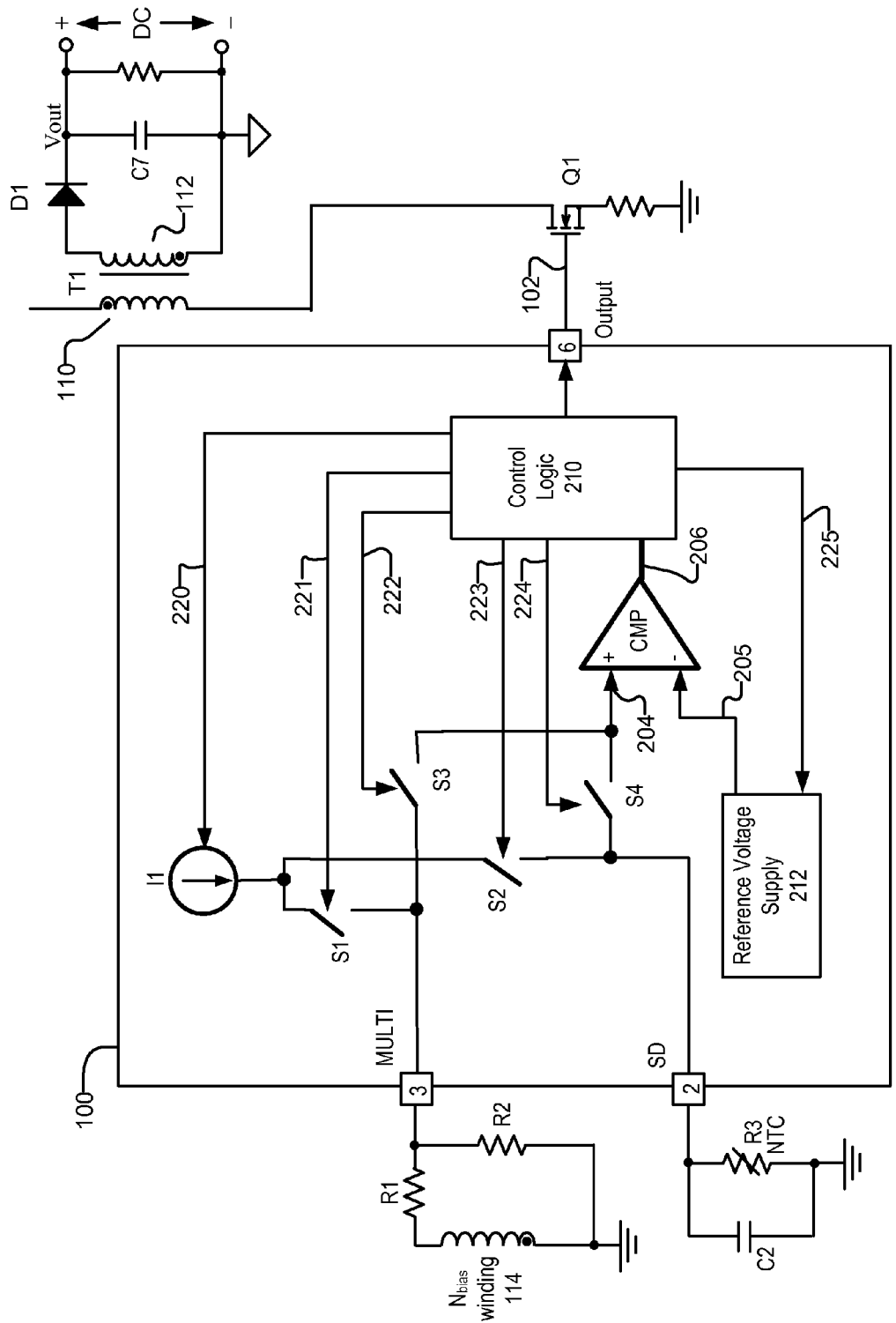
FIG. 2A illustrates the circuitry connected to the MULTI and SD pins of the power converter controller, according to one embodiment.

FIG. 2A illustrates the circuitry connected to the MULTI and SD pins of the power converter controller 100, according to one embodiment. FIG. 2A shows only a portion of the power converter controller 100 circuitry, and other portions of the power converter controller 100 that are not specifically relevant for explaining the present disclosure are omitted in FIG. 2A. As shown, the controller IC 100 includes a current source I1, a control logic 210, several switches S1, S2, S3 and S4, a comparator CMP, and a reference voltage supply 212.

A current source I1 can be connected to the MULTI pin through switch S1, or the current source I1 can be connected to the SD pin through switch S2, depending on whether the switches S1 and S2 are switched on or off. Switches S1 and S2 thus allow the current source I1 to be shared between the MULTI pin and the SD pin. Additionally, the non-inverting input of the comparator CMP can be connected to the MULTI pin through switch S3 or the SD pin through switch S4, depending on whether the switches S3 and S4 are switched on or off. Switches S3 and S4 thus allow sharing of the comparator CMP between the MULTI pin and the SD pin.

The on/off status of each switch S1, S2, S3 and S4 is controlled by the digital control logic 210 via control signals 221, 223, 222 and 224, respectively. In one embodiment, the switches are implemented with metal oxide semiconductor field effect transistors (MOSFET) or bipolar junction transistors (BJT). The digital control logic 210 controls the voltage level of reference voltage signal 205 produced by the reference voltage supply 212 via control signal 225. The digital control logic 210 may also control the amount of current generated by the current supply I1 via control signal 220.

The comparator CMP compares the voltage 204 at its non-inverting input to the reference voltage 205 at the inverting input and generates an output signal 206 that indicates whether the voltage 204 is greater than reference voltage 205. For example, if voltage 204 is higher than reference voltage 205, the output 206 of comparator CMP may be a logic "1". If voltage 204 is lower than reference voltage 205, the output 206 of comparator CMP may be a logic "0." During some modes of operation, the control logic 210 may configure a parameter of the control logic 210 based on the output 206 of the comparator. In other modes of operation, the control logic 210 may determine whether to power down the power converter based on the output 206 of the comparator.

When the power converter controller 100 is first powered on, the parallel resistance of R1 and R2 is used in setting an operational parameter of the digital control logic 210. Specifically, during a configuration mode when the power converter controller 100 is first powered on, switch S1 and S3 are closed and switches S2 and S4 are open. Current source I1 provides a current (e.g., a 100 µA-300 µA current) to the MULTI pin. Signal 102 is not driven and thus the $N_{BIAS}$ winding is virtually shorted. As a result R1 and R2 are essentially connected in parallel to ground. The current provided to the MULTI pin thus generates a voltage at the MULTI pin that is proportional to the parallel resistance of R1 and R2. This voltage is provided to the positive input of the comparator CMP as voltage 204 and compared to a reference voltage 205. The reference voltage 205 produced by reference voltage supply 212 is ramped up in incremental steps until it exceeds the voltage 204, upon which the output 206 of the comparator CMP switches logic states. Alternatively, the reference voltage 205 may be ramped down until it is lower than the voltage 204. By ramping up and down the reference voltage 205, the resistance range of the parallel resistors R1 and R2 can be identified (i.e. from the reference voltage 205 level that causes the comparator CMP output 206 to trip), and the digital control logic 210 then uses this information to set an operational parameter accordingly.

In one embodiment, an operational parameter refers to any configurable setting of the power converter controller 100 that affects the operation of the power converter controller 100. Examples of configurable operational parameters include: cable drop compensation (CDC), shut-down temperature for OTP, shut-down voltage for OVP, maximum switching frequency of the power converter, length of a soft-start time and/or scheme and minimum no-load switching frequency of the power converter, etc. Any of these parameters can be set according to the external circuitry (e.g. R1 and R2), which allows the parameters of the controller IC to be tailored to the specific needs of the power converter.

CDC is a parameter that compensates for voltage drop over a cable (not shown) that is connected between the DC output of the power converter and a load device. A cable typically has an electrical resistance that causes a non-trivial amount of voltage to drop across the cable, especially as the current carried by the cable increases. CDC accounts for this voltage drop by increasing the output DC voltage level in an attempt to maintain a target voltage at the load device. The following table shows an example of how the combined resistance of R1 and R2 results in different settings for the CDC parameter:

| | Paralleled R1 and R2 Resistance (kΩ) | | | | |
|---|---|---|---|---|---|
| | 0-2.20 | 2.37-3.21 | 3.40-4.64 | 4.87-6.65 | 6.98-100 |
| CDC setting | 1 | 2 | 3 | 4 | 5 |
| Compensation amount (mV) | 0 | 75 | 150 | 300 | 450 |

This table represents the CDC at full load when the non-compensated DC output is 5.0 V. For different DC output voltages, the compensated voltage may be scaled up or down accordingly as needed. In other embodiments, there may be a greater or fewer numbers of possible CDC settings and the resistance ranges for each CDC setting may be different.

Maximum switching frequency of the power converter refers to the maximum frequency at which the output control signal 102 switches between $T_{ON}$ and $T_{OFF}$. The switching frequency in a switch-mode power supply is a critical parameter that relates to many key performance criteria of power supplies including cost, size, efficiency, Electromagnetic Interference (EMI), etc, which often conflict between each other. Allowing the switching frequency to be selectable by external circuitry provides a user with the flexibility to make the right trade-off between the performance criteria based on their own needs.

Soft-start time refers to the time allotted for soft-start, and soft-start scheme refers to a specific method of building up the output voltage during soft-start. Soft-start is a key requirement for power supplies. During soft-start, the IC controller 100 brings up the output voltage in a controlled fashion to limit the inrush current at startup, to prevent output voltage overshoot, and to reduce component stress when compared to a hard start. To meet the above requirements, a good soft-start scheme needs to be tailored for the power supply's output stage, such as the output capacitor C7 and load (not shown). Allowing the soft-start time and/or soft-start scheme to be selectable by external circuitry provides a user with flexibility in designing the output stage.

No-load switching frequency refers to the switching frequency of the output signal 102 when the output of the power converter is not driving a load. The no-load switching frequency is also an important parameter and the setting of this parameter involves a trade-off between no-load standby power consumption and dynamic transient response. Allowing the no-load switching frequency to be selectable by external circuitry also provides flexibility in designing a power converter.

During a protection mode, the resistance of the external resistors R1 and R2 are used to provide OVP protection through the MULTI pin. The protection mode may occur after the configuration mode is complete and is distinct from the configuration mode. Specifically, S2 and S3 are now closed, and S1 and S4 are open in the protection mode. During off-times ($T_{OFF}$) of the switch Q1 when energy is being transferred from the primary windings 110 to the secondary windings 112 of the transformer T1, the voltage at the MULTI pin corresponds to the DC output voltage reflected on the $N_{BIAS}$ winding but scaled down by the turns ratio between the auxiliary winding $N_{BIAS}$ and the secondary winding 112 of the transformer T1, and further scaled down by the voltage divider formed by resistors R1 and R2. This voltage is fed to the comparator's CMP non-inverting input as voltage 204 and compared to the reference voltage 205. The reference voltage signal 205 is set to a voltage level (e.g. in the range 1.0 V-2.0V) that should not be exceeded by the voltage 204 at the non-inverting input unless an over-voltage condition is present. If the voltage 204 at the non-inverting input exceeds the voltage level of the reference voltage signal 205, the comparator CMP output 206 switches high to indicate an over-voltage condition and the digital control logic 210 powers down the power converter to prevent any further damage.

In one embodiment, to power down the power converter, the IC controller 100 turns off Q1 so that transformer T1 stops storing energy. The controller IC 100 still consumes current (e.g., several mA) because some functions blocks inside the IC are still active. The power supply voltage 130 at the Vcc pin voltage gradually drops because transformer T1 stops transferring energy to both the output side and to the Vcc pin. When the supply voltage 130 drops below a certain voltage level (e.g. 5.5V), the IC 100 totally shuts down. Consequently, the supply voltage 130 can be charged up again until it reaches a Vcc startup threshold (e.g. 12V), and a new soft-start process begins. If the OVP condition persists, the IC 100 will shut down again and continue to power cycle until the fault is cleared. If the fault is cleared, the IC 100 completes the soft-start, and the IC 100 runs at a stable condition.

By controlling the state of the switches S1, S2, S3 and S4 and by operating in different modes, multiple functions such as configuration of operating parameters and OVP can thus be shared with a single MULTI pin. Using the MULTI pin to support multiple functions increases the functionality of the IC controller 100 without significantly increasing the manufacturing cost of the controller 100.

Additionally, during another protection mode, the resistance of NTC R3 is used to provide over-temperature protection through the SD pin. Specifically, during this other protection mode switches S2 and S4 are closed and switches S1 and S3 are open. The current provided by current source I1 generates a voltage at the SD pin that is proportional to the resistance of R3. As the temperature increases, R3 decreases in resistance because it is a NTC device. The decreased resistance also causes the voltage at the SD pin to decrease. The voltage at the SD pin is fed to the comparator's CMP non-inverting input as voltage 204 and compared to the reference voltage 205. The reference voltage 205 is set to a voltage level (e.g. 1.0 V-2.0V) that should be higher than the voltage 204 at the non-inverting input unless an over temperature condition exists. If the voltage 204 falls below the reference voltage 205, the output of the comparator 206 switches low to indicate an over-temperature condition and the digital control logic 210 powers down the power converter to prevent any further damage.

By changing the state of the switches S3 and S4, the comparator CMP can thus be shared between the MULTI pin and the SD pin while maintaining the functionality provided by both the MULTI pin and the SD pin. Sharing the comparator CMP is beneficial for reducing the manufacturing cost of the IC controller 100 without affecting the performance of the controller 100.

In one embodiment, the OTP of the controller IC 100 has hysteresis such that OTP is triggered at a high temperature (e.g. 150 degrees Celsius) and recovers at a lower temperature (e.g. 100 degrees Celsius). In other words, once OTP is triggered, the IC controller 100 will continue to shut down the power converter in subsequent power cycles until the temperature drops to an acceptable level.

In some embodiments, the SD pin can be used to provide general shutdown protection and is not just limited to providing OTP. R3 can be any type of device so long as its resistance can vary and represent certain desirable protection features of the power converter, such as over/under voltage conditions, over current conditions, short circuit conditions, etc. Under a given protection tripping condition, the resistance of R3 can drop to a level that causes the SD voltage to drop below the reference voltage 205, thereby triggering a shutdown and protecting the power converter from damage. In other embodiments, any external circuitry that causes a voltage at the SD pin to change (i.e. rise or drop) during a fault condition can be used in place of R3.

In another embodiment, the SD pin is also a multi-function pin that is used to configure an operational parameter (e.g., CDC) at startup. During startup, switches S2 and S4 may be closed while switches S1 and S3 are open. Current source I1 provides a current to the SD pin, which charges capacitor C2. As the capacitor C2 charges, the voltage at the SD pin ramps up with a slope that is inversely proportional to C2 at the beginning of the ramp. This voltage is fed to the comparator's CMP non-inverting input as voltage 204 and compared to the reference voltage 205. The amount of time that passes before voltage 204 at the non-inverting input exceeds the reference voltage 205 is used by the digital control logic to set the parameter. After the parameter is configured, the SD pin is then used for OTP during a protection mode.

Figure 2B:
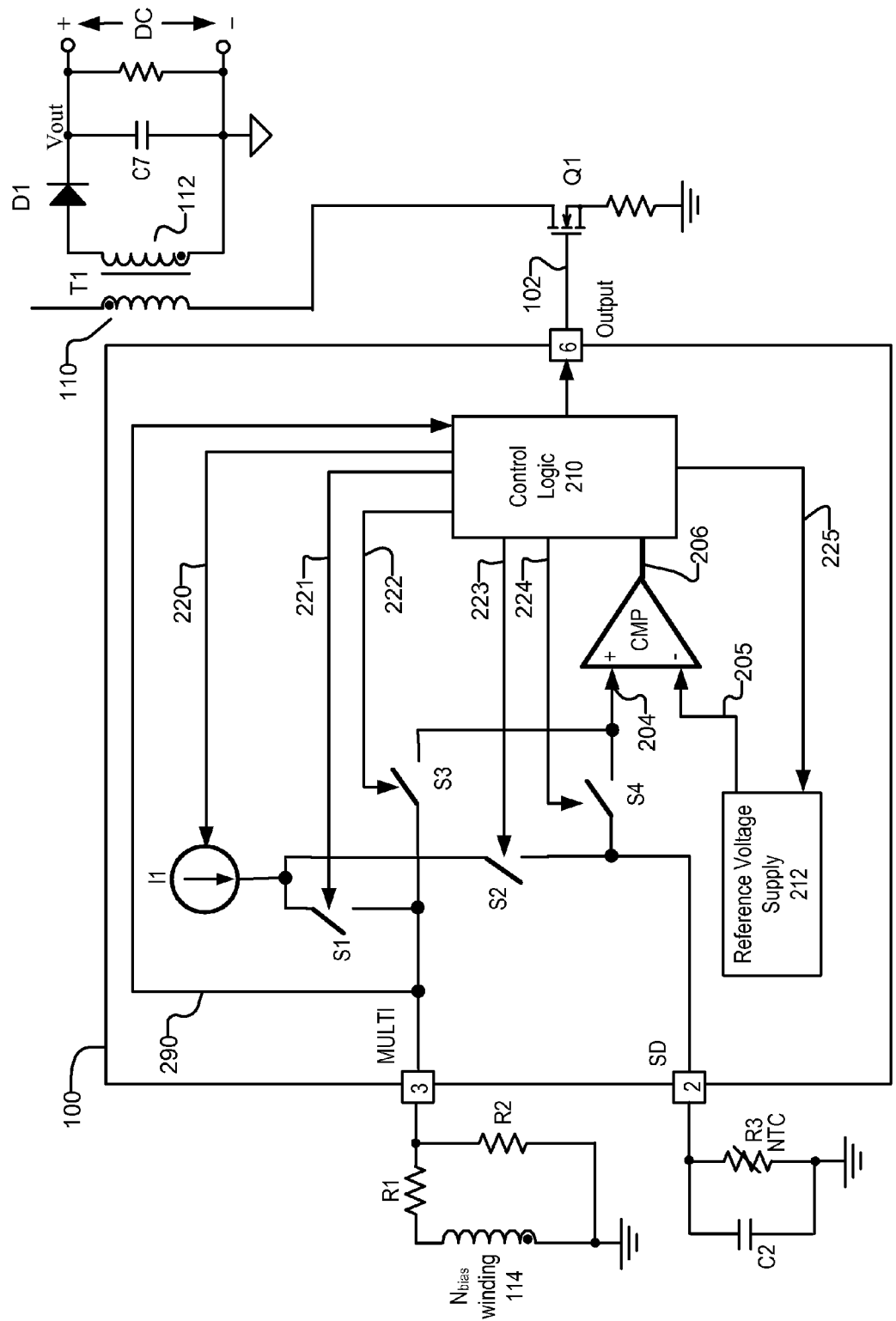
FIG. 2B illustrates the circuitry connected to the MULTI and SD pins of the power converter controller, according to another embodiment.

FIG. 2B illustrates the circuitry connected to the MULTI and SD pins of the power converter controller 100, according to another embodiment. The controller 100 in FIG. 2B is similar to the controller 100 from FIG. 2A, but now includes an additional feedback signal 290 that provides a feedback voltage from the MULTI pin to the control logic 210. The addition of the feedback signal 290 allows the MULTI pin to be used for $V_{SENSE}$ functionality in addition to parameter configuration and OVP protection. Thus, the need for a separate $V_{SENSE}$ pin is eliminated.

Specifically, the resistance of the external resistors R1 and R2 not only can be used to provide OVP protection, but also can provide the output voltage feedback information which can be used for the feedback loop control and regulation. This is because the voltage at the MULTI pin corresponds to the DC output voltage reflected on the $N_{BIAS}$ winding but scaled down by the turns ratio between the auxiliary winding $N_{BIAS}$ and the secondary winding 112 of the transformer T1, and further scaled down by the voltage divider formed by resistors R1 and R2. The control logic 210 then uses the feedback signal ($V_{SENSE}$) 290 to regulate the $T_{ON}$ and $T_{OFF}$ times of the switch Q1, thereby regulating the DC output level of the power converter.

The MULTI pin is thus similar to the $V_{SENSE}$ pin of FIG. 1 in terms of the ability to obtain the output voltage information for feedback control. Therefore, the MULTI pin and $V_{SENSE}$ pin can be further simplified and combined as one pin. On the other hand, the embodiment shown in FIG. 1 uses the MULTI pin and the $V_{SENSE}$ pin separately to provide extra or supplemental voltage feedback and protection, which can enhance the reliability and robustness of the power converter under abnormal or fault conditions. In some embodiments, the MULTI pin may only be used for parameter configuration and $V_{SENSE}$ functionality but not OVP protection.

Figure 3:
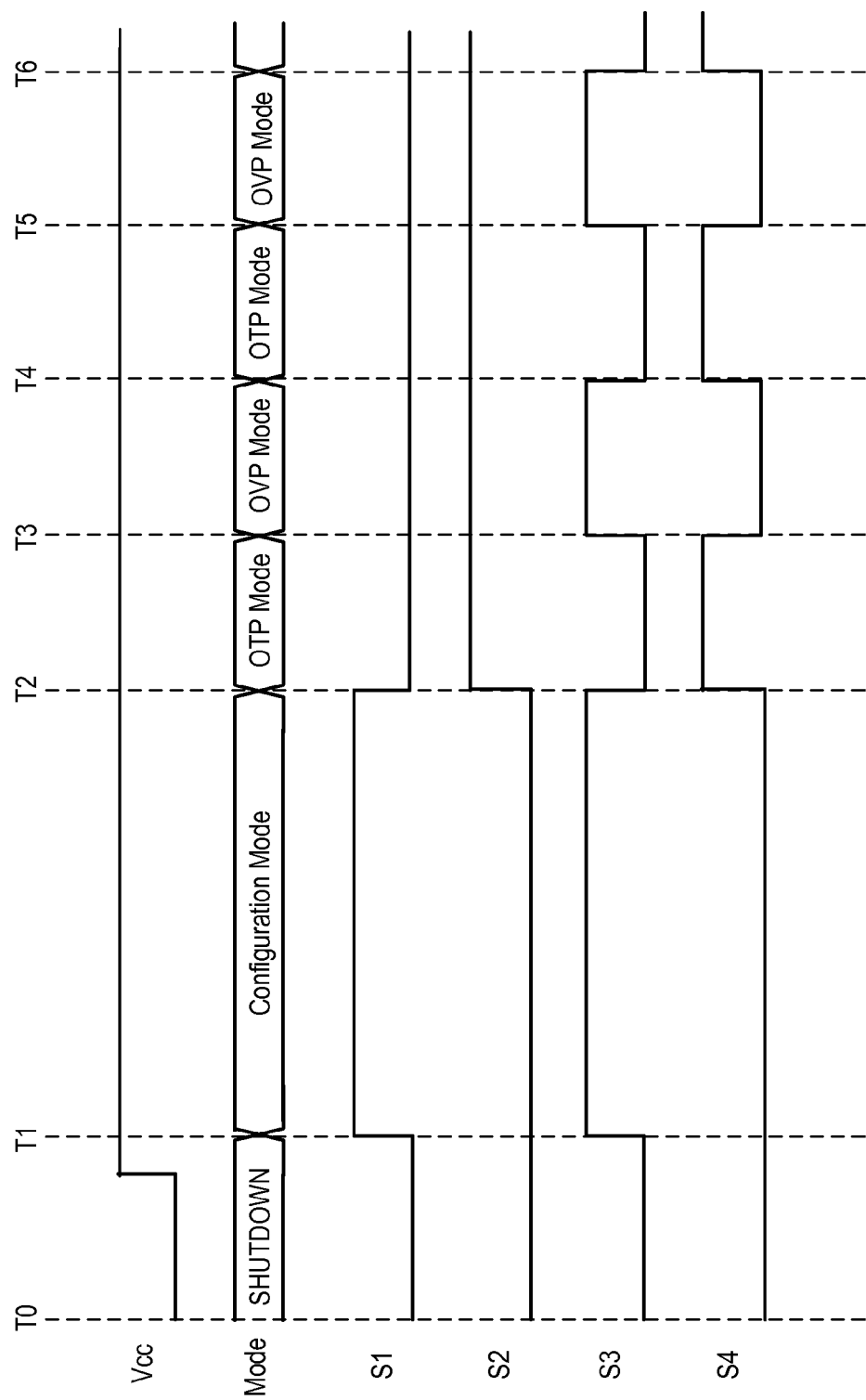
FIG. 3 is a timing diagram for the different operating modes of the power converter controller, according to one embodiment.

FIG. 3 is a timing diagram of the power converter controller 100 according to one embodiment. As shown, the control logic 210 operates in different modes during distinct (i.e. non-overlapping) periods of time. At time T0, the supply voltage Vcc is off and the control logic 210 is in a Shutdown Mode. Prior to time T1, the supply voltage Vcc is powered on. After the supply voltage Vcc rises to a sufficient voltage level, the digital control logic 210 enters the Configuration Mode at time T1. S1 is and S3 are closed and S2 and S4 are open. During the Configuration Mode, the voltage at the MULTI pin is sensed and compared to the reference voltage 205 in order to set a parameter supported by the IC controller 100.

At time T2, parameter configuration is complete and the control logic 210 starts toggling back and forth between the OTP Mode and the OVP Mode. During OTP Mode, S2 and S4 are closed and S1 and S3 are open. This configuration of switches allows the voltage at the SD pin to be compared to the reference voltage 205 to provide OTP if the temperature is too high, or to provide other forms of shutdown protection if a protection tripping condition is met. During OVP mode, S2 and S3 are closed and S1 and S4 are open. This configuration of switches allows the voltage at the MULTI pin to be compared to the reference voltage 205 to provide OVP by shutting down the power controller if the voltage is too high. Additionally, the voltage at the MULTI pin can be used as the output voltage feedback for control and regulation purpose.

In one embodiment, the OTP and OVP Modes can each be a number of cycles long, such as 8 to 32 or more, as determined by an internal clock of the control logic 210 as well as the power converter operations.

In embodiments where the SD pin but not the MULTI pin is used to set a parameter, the on/off status of the switches is reversed during the Configuration Mode. S1 and S3 would be open and S2 and S4 would be closed to allow a current to be injected into the SD pin. In embodiments where the SD pin and the MULTI pin are both used to set different parameters, there may be two separate Configuration Modes. During one Configuration Mode for setting a parameter according to a voltage at the MULTI pin, S1 and S3 are closed. During another Configuration Mode for setting a parameter according to a voltage at the SD pin, S2 and S4 are closed.

Upon reading this disclosure, those of ordinary skill in the art will appreciate still additional alternative structural and functional designs for a multi-function pin for a power converter controller IC through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A controller integrated circuit (IC) for controlling a power converter, the controller IC comprising:
    a first IC pin to connect to circuitry of the power converter that is external to the controller IC;
    control circuitry operating in a first mode or a second mode, the first mode and second mode corresponding to distinct periods of time,
    wherein in the first mode the control circuitry configures an operating parameter of the controller IC based on a first voltage level at the first IC pin; and
    wherein in the second mode the control circuitry conditionally triggers a shutdown of an output voltage of the power converter depending on a second voltage level at the first IC pin, the control circuitry shutting down the output voltage by generating a control signal to turn off a switch of the power converter to power down the output voltage.

2. The controller IC of claim 1, wherein in the second mode the control circuitry also regulates an output voltage of the power converter based on the second voltage level at the first IC pin.

3. The controller IC of claim 1, further comprising:
    a comparison circuit to compare the first voltage level at the first IC pin to a reference voltage signal during the first mode, and to compare the second voltage level at the first IC pin to the reference voltage signal during the second mode,
    wherein the control circuitry configures an operating parameter of the controller IC based on an output of the comparison circuit during the first mode and conditionally triggers the shutdown based on the output of the comparison circuit during the second mode.

4. The controller IC of claim 3, further comprising:
    a reference voltage supply to generate the reference voltage signal under the control of the control circuitry, the reference voltage signal having an incrementally ramping voltage level during the first mode and a fixed voltage level during the second mode.

5. The controller IC of claim 1, further comprising:
    a current source to generate an electrical current; and
    a switch coupled between the current source and the first IC pin, the switch closed during the first mode to provide a current path between the current source and the first IC pin and open during the second mode to block the current path between the current source and the first IC pin.

6. The controller IC of claim 1, further comprising:
    a current source to generate an electrical current; and
    a switch coupled between the current source and the first IC pin, the switch closed during both the first mode and the second mode to provide a current path between the current source and the first IC pin.

7. The controller IC of claim 1, wherein the operating parameter configured in the first mode based on a first voltage level at a first IC pin of the controller IC is a cable drop compensation parameter of the controller IC that compensates for voltage drop over a cable coupled to an output of the power converter.

8. The controller IC of claim 1, wherein the operating parameter configured in the first mode based on a first voltage level at a first IC pin of the controller IC is a maximum switching frequency parameter of the controller IC that controls a maximum switching frequency of the power converter.

9. The controller IC of claim 1, wherein the operating parameter configured in the first mode based on a first voltage level at a first IC pin of the controller IC is a soft-start parameter of the controller IC that controls at least one of a soft-startup time or scheme of the power converter.

10. The controller IC of claim 1, wherein in the second mode the second voltage level at the first IC pin is indicative of a level of the output voltage.

11. The controller IC of claim 1, wherein in the second mode the second voltage level at the first IC pin is indicative of a temperature of the power converter.

12. The controller IC of claim 1, wherein the first mode occurs when the controller IC is powered on, and the second mode occurs after the first mode is complete.

13. The controller IC of claim 1, further comprising:
    a second IC pin to connect to additional circuitry of the power converter that is external to the controller IC;
    wherein in a third mode the control circuitry conditionally triggers a shutdown of the output voltage in dependence on a voltage level at the second IC pin.

14. The controller IC of claim 13, further comprising:
    a comparison circuit to compare the first voltage level at the first IC pin to the reference voltage signal during the first mode, to compare the second voltage level at the first IC pin to the reference voltage signal during the second mode, and to compare a voltage level at the second IC pin to the reference voltage signal during the third mode, and
    wherein the control circuitry configures a parameter of the IC controller based on an output of the comparison circuit during the first mode and conditionally triggers a shutdown of the output voltage depending on the output of the comparison circuit during the second and third modes.

15. The controller IC of claim 14, further comprising:
    a current source configured to generate an electrical current;
    a first switch coupled between the current source and the first IC pin, the first switch closed during a first mode to provide a current path between the first switch and the first IC pin and open during second and third modes to block the current path between the first switch and the first IC pin; and a second switch coupled between the current source and the second IC pin, the second switch closed during the second and third modes to provide a current path between the current source and the second IC pin and open during the first mode to block the current path between the current source and the second IC pin.

16. A power converter for converting an input voltage to an output voltage, the power converter comprising:

a transformer coupled between the input voltage and the output voltage of the power converter;

a switch to control current through the transformer based on a control signal;

a controller integrated circuit (IC) to generate the control signal to control on and off times of the switch, the controller IC operating in a first mode or a second mode that correspond to distinct periods of time; and first circuitry that is external to the controller IC and connected to a first IC pin of the controller IC;

wherein in the first mode the controller IC configures a parameter of the controller IC based on a first voltage level at the first IC pin, wherein in the second mode the controller IC conditionally triggers a shutdown of an output voltage of the power converter depending on a second voltage level at the first IC pin, the controller IC shutting down the output voltage by turning off the switch via the control signal to power down the output voltage.

17. The power converter of claim 16, wherein in the second mode the controller IC also regulates the output voltage of the power converter based on the second voltage level at the first IC pin.

18. The power converter of claim 16, wherein the first circuitry comprises a first resistor in series with an auxiliary winding of the transformer and a second resistor in parallel with the first resistor and auxiliary winding.

19. The power converter of claim 16, wherein the first circuitry comprises a negative temperature coefficient resistor in parallel with a capacitor.

20. The power converter of claim 16, further comprising:

second circuitry that is external to the controller IC and connected to a second IC pin of the controller IC;

wherein the power controller IC further operates in a third mode distinct in time from the first mode and second mode, and wherein in the third mode the power controller IC conditionally triggers the shutdown of the output voltage depending on a voltage level at the second IC pin.

21. A method of operation in power converter having a controller integrated circuit (IC) that regulates an output voltage of a power converter, the controller IC operating in a first mode or a second mode during distinct periods of time, the method comprising:

in the first mode, configuring a parameter of the controller IC based on a first voltage level at a first IC pin of the controller IC, the first IC pin connected to first circuitry of the power converter that is external to the controller IC; and in the second mode, conditionally triggering a shutdown of the output voltage of the power converter depending on a second voltage level at the first IC pin.

22. The method of claim 21, further comprising, in the second mode regulating the output voltage of the power converter based on the second voltage level at the first IC pin.

23. The method of claim 21, wherein:

in the first mode, configuring a parameter of the IC controller further comprises comparing the first voltage level at the first IC pin to a reference voltage signal to generate an output signal and configuring the parameter of the controller IC based on the output signal; and in the second mode, conditionally triggering the shutdown further comprises comparing the second voltage level at the first IC pin to the reference voltage signal to generate the output signal and conditionally triggering the shutdown based on the output signal.

24. The method of claim 21, further comprising:

generating an electrical current;

in the first mode, connecting a current source to the first IC pin to generate the first voltage level at the IC pin; and in the second mode, disconnecting the current source from the first IC pin.

25. The method of claim 21, further comprising:

in a third mode that is distinct from the first and second modes, conditionally triggering the shutdown of the output voltage depending on a voltage level at a second IC pin of the IC controller.

26. The method of claim 25, wherein:

in the first mode, configuring a parameter of the IC controller further comprises comparing the first voltage level at the first IC pin to a reference voltage signal to generate an output signal and configuring a parameter of the controller IC based on the output signal;

in the second mode, conditionally triggering the shutdown of the output voltage further comprises comparing the second voltage level at the first IC pin to the reference voltage to generate the output signal and conditionally triggering the shutdown of the output voltage based on the output signal; and in the third mode, conditionally triggering the shutdown of the output voltage further comprises comparing the voltage at the second IC pin to the reference voltage to generate the output signal and conditionally triggering the shutdown of the output voltage based on the output signal.

27. The method of claim 25, further comprising:

in the first mode, connecting a current source to the first IC pin to generate the first voltage level at the first IC pin;

in the second mode, disconnecting the current source from the first IC pin; and in the third mode, connecting the current source to the second IC pin to generate the voltage at the second IC pin.

28. The method of claim 21, wherein configuring a parameter of the IC controller comprises configuring, based on the first voltage level at the first IC pin of the controller IC, a cable drop compensation parameter of the controller IC that compensates for voltage drop over a cable coupled to an output of the power converter.

29. The method of claim 21, wherein conditionally triggering the shutdown further comprises comparing the second voltage level at the first IC pin to a reference voltage signal to generate an output signal and triggering the shutdown responsive to the output signal indicating that the second voltage level exceeds the reference voltage signal.

30. The method of claim 21, wherein conditionally triggering the shutdown further comprises comparing the second voltage level at the first IC pin to a reference voltage signal to generate an output signal and triggering the shutdown responsive to the output signal indicating that the second voltage level is below the reference voltage signal.

* * * * *